May 16, 1944.  L. R. STREETER  2,349,122
SOUND FILM APPARATUS
Filed Oct. 9, 1942    4 Sheets-Sheet 1

LEO R. STREETER,
INVENTOR.

BY  W. E. Beatty
ATTORNEY.

May 16, 1944.   L. R. STREETER   2,349,122
SOUND FILM APPARATUS
Filed Oct. 9, 1942   4 Sheets-Sheet 2

LEO R. STREETER,
INVENTOR.

BY W. H. Beatty
ATTORNEY.

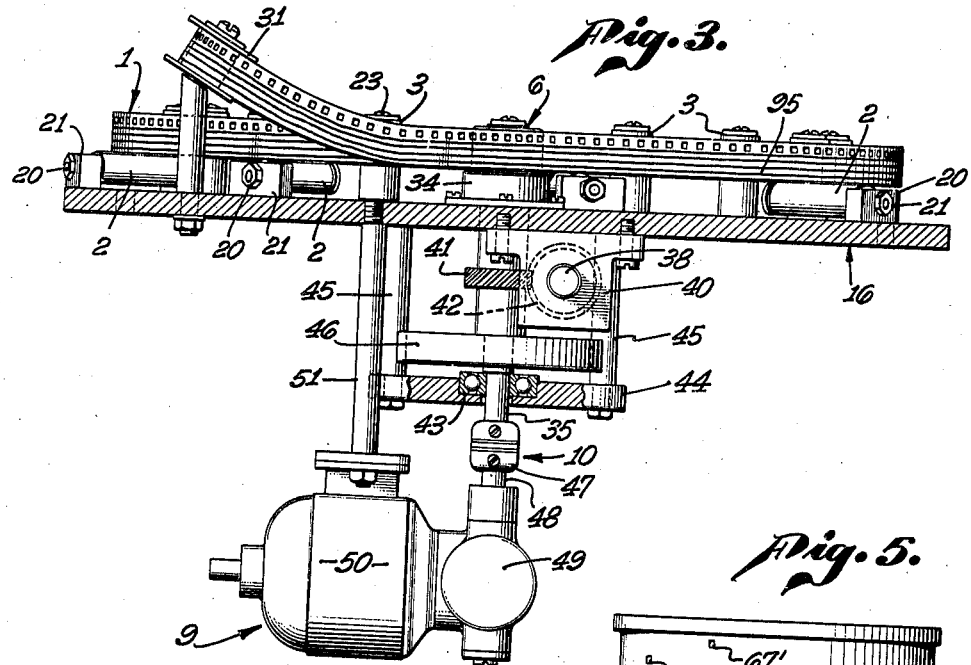
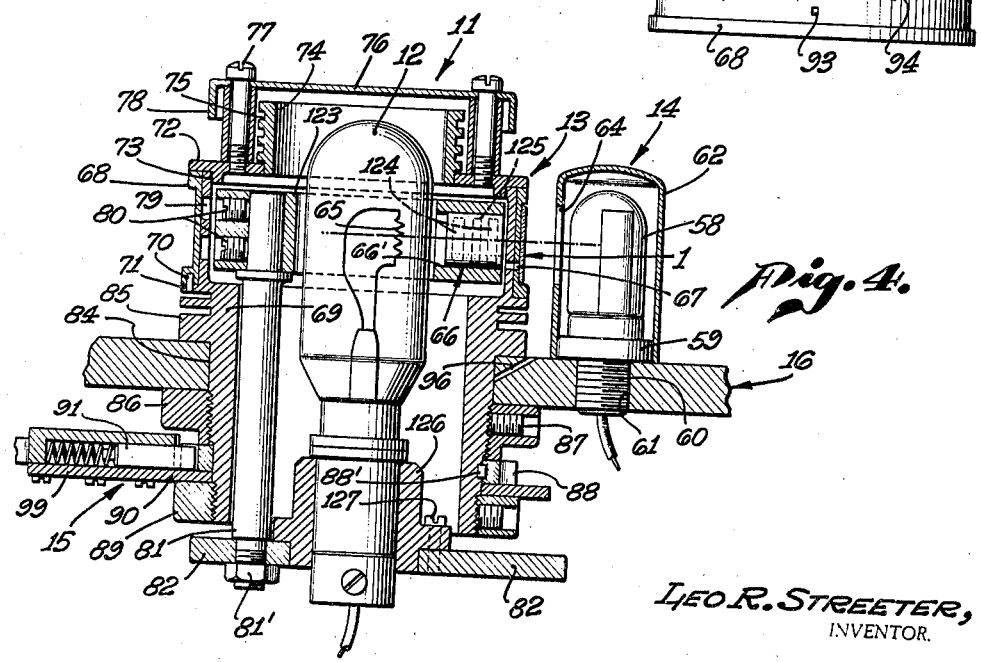

May 16, 1944.  L. R. STREETER  2,349,122
SOUND FILM APPARATUS
Filed Oct. 9, 1942  4 Sheets-Sheet 4

LEO R. STREETER,
INVENTOR.

BY W. L. Beatty
ATTORNEY.

Patented May 16, 1944

2,349,122

UNITED STATES PATENT OFFICE 2,349,122

SOUND FILM APPARATUS

Leo R. Streeter, Los Angeles, Calif.

Application October 9, 1942, Serial No. 461,504

1 Claim. (Cl. 88—24)

The invention relates to sound film apparatus and more particularly to sound film having a plurality of sound tracks thereon, and to arrangements for recording sound on such film and for reproducing sound therefrom.

More particularly the invention relates to a sound film reproducer especially adapted for operation with coin controlled apparatus.

It has heretofore been proposed to provide multiple sound tracks on a film, wherein the film is a straight length of film, the length of each track being the length of the film, in other words all of the sound tracks terminate at one end of the film and hence the time of play of each sound track bears a definite relation to the length of the film, thereby restricting flexibility in the arrangement of the sound tracks on the film.

According to one feature of the invention, I provide a sound film having multiple sound track portions wherein the time of play need bear no definite relation to the length of the film, and wherein an economy of space results. This is accomplished by employing an endless loop of film and by providing a plurality of parallel track portions thereon and connected by slant track portions into one continuous sound track, the effective length of which is several times the length of the loop. Except for a short space where the slant track portions occur, the various sound track portions are parallel to the edge of the film throughout the length of the loop, and this gives an economy of space.

According to another feature of the invention, I provide a drive and slit assembly for a multiple track sound translating device, namely for a recorder or reproducer for following the above mentioned track.

According to another feature of the invention, and this has particular advantage for coin control use, I provide means for automatically shifting the sound pickup from the end of the sound track which is adjacent one margin of the film, to the start of the sound track adjacent the other margin, so that the apparatus will always be in condition to be operated by the coin control, means also being provided for shifting the position of the sound pickup to follow the slant track portions and align the pickup with the next parallel track portion. Hence the endless film loop may be provided with a plurality of sound track portions each having a length corresponding to the time of play determined by the coin control apparatus, while the length of each sound track portion need bear no particular relation to the length of the film loop as it can be either shorter or longer than that loop, as the sound pickup is shifted onto a parallel track portion when the end of the film loop is reached regardless of the length of play determined by the coin control. For a long play record, if desired, a continuous track may be used throughout the film. However, for coin control working with say four minutes of playing time, the sound recording would end in that time and then a brief silent period would follow to allow the reproducing apparatus to get up to speed and to allow the exciter lamp and amplifier tubes to warm up after the next coin is dropped and before the start of the next sound record.

For further details of the invention, reference may be made to the drawings wherein Figs. 1 and 2 are top and bottom plan view, respectively, of sound film apparatus according to the present invention.

Fig. 3 is a vertical sectional view on line 3—3 of Fig. 1 looking in the direction of the arrows.

Fig. 4 is a vertical sectional view, with a part of the base broken away, on line 4—4 of Fig. 1 looking in the direction of the arrows.

Fig. 5 is a view in side elevation of a light-slit drum employed in the apparatus of Figs. 1 and 2.

Figure 1:
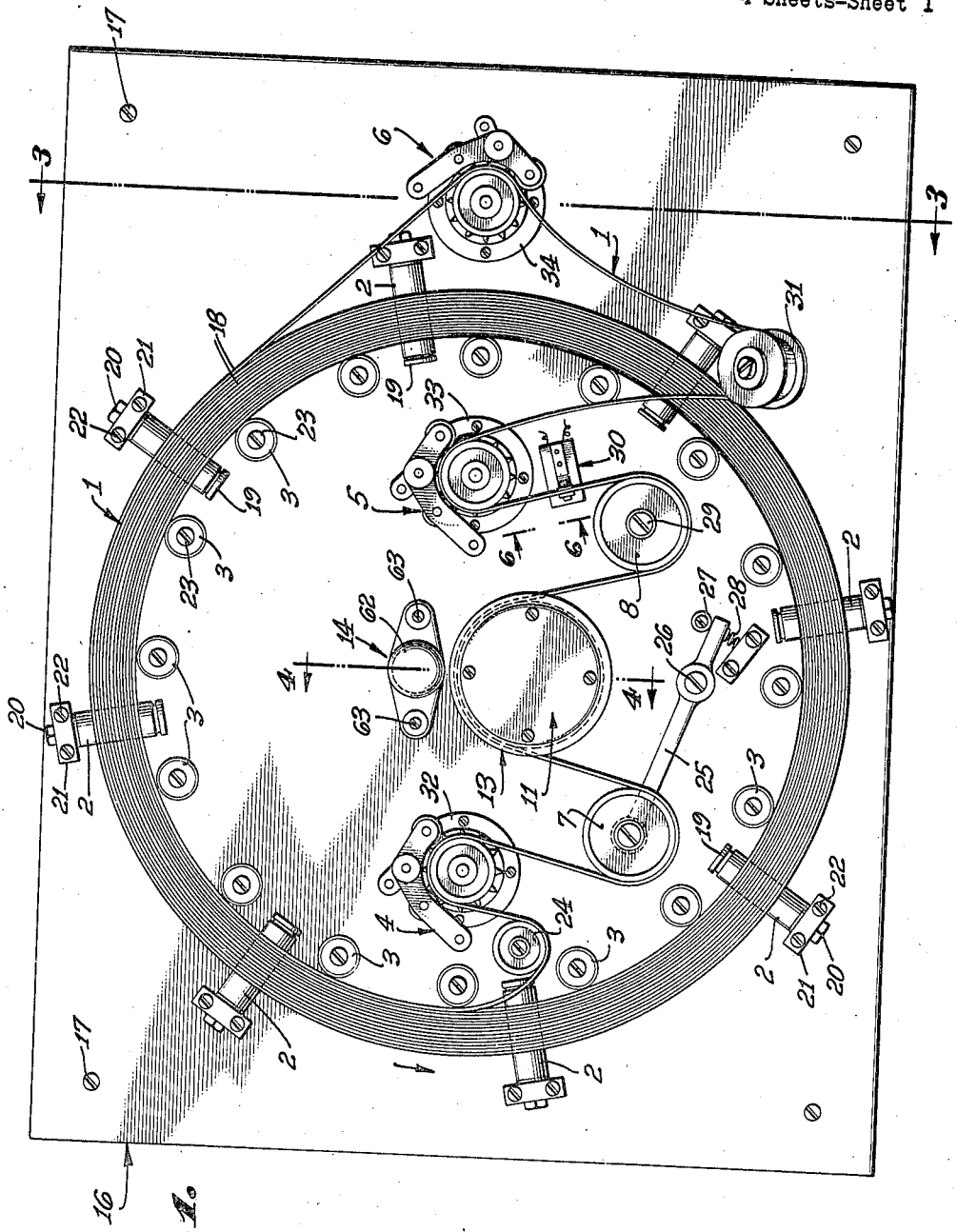

Referring in detail to the drawings, the endless film loop indicated at 1, the horizontal rollers 2 and the vertical rollers 3 therefor, together with the three driving sprockets 4, 5 and 6, the tension roller 7, fixed roller 8, the motor 9 and its driving connection 10 to the sprockets 4, 5 and 6, and the sound pickup 11 comprising the exciter lamp 12, slit assembly 13 and light-sensitive cell 14, together with the slit shifter 15 are all mounted as a unit on a common base 16 which is a rectangular panel of insulating material or metal having suitable screws 17 or the like for securing it in position on a support or in a cabinet, not shown.

The endless film loop 1 comprises a plurality of circular coils 18 of the film, supported by a circular array of spaced horizontal rollers 2, each mounted on a stud 19 held by a nut 20 in a block 21 secured to the base 16 by screws or the like 22. The circular coil of film 18 embraces the circular array of spaced vertical rollers 3 each having a stud 23 screw-threaded into or otherwise secured to the base 16.

At a point inside of the coil 18, as shown at the left inside center of this coil, the film is led around a fixed roller 24, over sprocket 4, around the tension roller 7 which is mounted on one end of an arm 25, pivotally supported intermediate its ends at 26, and the opposite end of which is provided with a stop 27 and a compression spring 28. From the tension roller 7, the film is led around the slit assembly 13, and around the fixed roller 8 which has a stud 29 secured to the base 16. The film is then led along side of the breaker switch 30, around the sprocket 5, across the coil 18 to an elevated guide roller 31, and then to the sprocket 6 which feeds the film to the outside of the coil 18.

Figure 2:
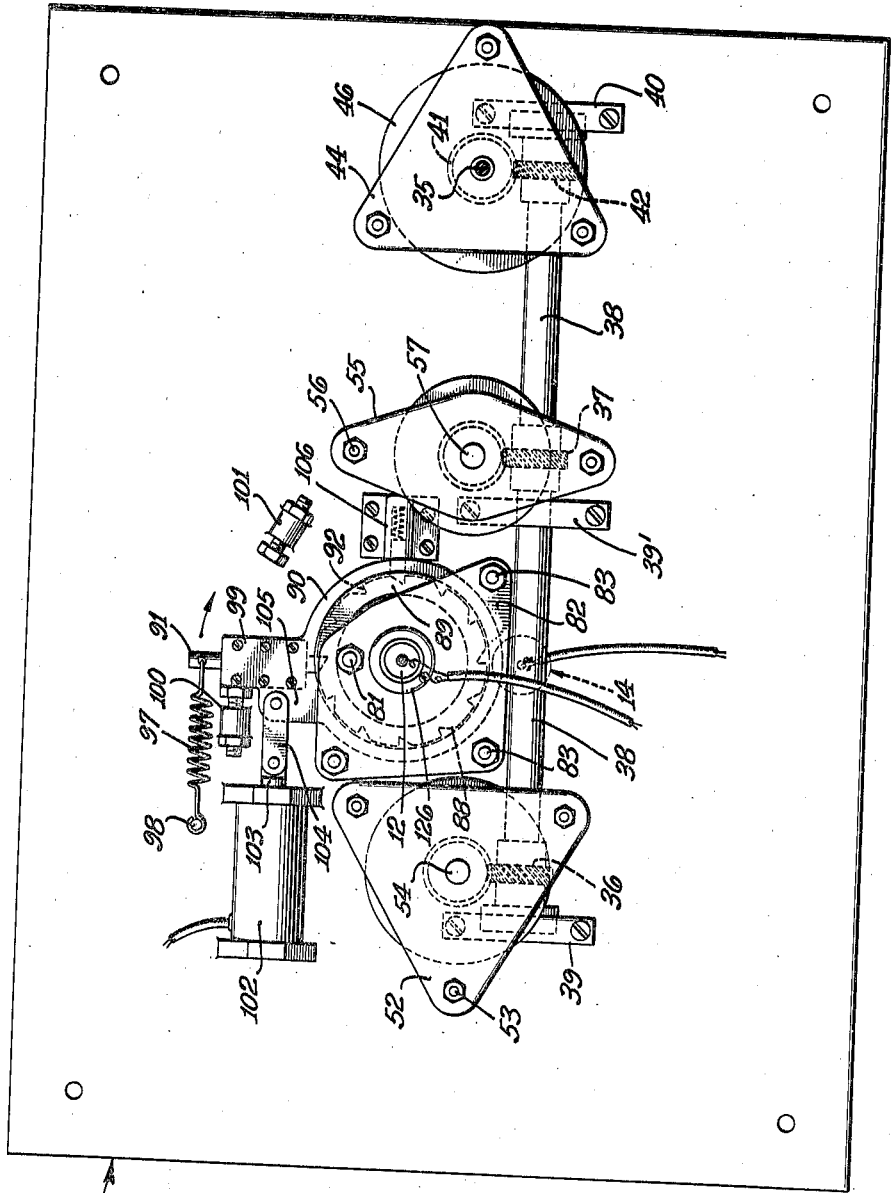

The sprockets 4, 5 and 6 are in alignment and mounted on fixed supports 32, 33 and 34, respectively, secured to the top of the base 16. The sprocket 6 is mounted on and driven by the motor shaft 35 in a counter-clockwise direction, while the sprockets 4 and 5 are driven from gears 36 and 37 in a clockwise direction. The gears 36 and 37 are mounted on a cross shaft 38 rotatably supported in bearings 39, 39' and 40 mounted on the bottom of base 16 as shown in Fig. 2. Shaft 38 is driven by a gear 41 on the drive shaft 35, meshing with a gear 42 on the shaft 38. As shown in Fig. 3, the drive shaft 35 is mounted in a bearing 43 carried in a triangular shaped plate 44 supported by three legs 45 from the underside of the base 16. Above the plate 44, the shaft 35 has a flywheel 46. The shaft 35 is connected by a suitable coupling 47 to a slow speed motor shaft 48 extending from the gear reduction 49 which forms a part of the motor 50. Motor 50 is supported below the bottom of base 16 by bolts 51.

A plate 52 similar to plate 44 is spaced from the body of base 16 by legs 53, and serves to rotatably support shaft 54 driven from gear 36 and which drives the sprocket 4. Similarly a plate 55 mounted below the base 16 by legs 56 serves to rotatably support shaft 57 driven by gear 37, the shaft 57 driving the sprocket 5.

As shown in Figs. 3 and 4, inside of coil 18 and at one side of the film is arranged the light-sensitive cell 14 comprising a vacuum tube 58 having a base 59 with screw threads 60 engaged in a threaded aperture 61 in the base 16. Over the cell 58 is arranged a cover 62 secured to base 16 by screws 63. The cover 62 has an elongated light slit 64 extending across the full width of the film and in alignment therewith on the other side of the film is the slit assembly 13 which comprises the following elements: The lamp 12 has a filament 65 which extends across the film parallel to the slot 64. The light from filament 65 by means of a suitable lens assembly 66 produces a line of light extending the full width of the series of apertures 67 in the drum 68. The drum 68 is mounted on a concentric cylindrical drum carrier 69 and is removably secured in position thereon by a pin 70. The lamp 12 is arranged along the common axis of the cylindrical drum 68 and drum carrier 69, and the same series of light apertures 67 in the drum 68 are also arranged in the drum carrier 69. The pin 70 is secured in the drum carrier 69, while the drum 68 is slidable onto and off from this pin, the drum 68 being held on the shoulder formed by the circular flange 71 by means of the flanged ring 72 which has threaded engagement with the inside of the top of the drum carrier 69 as indicated at 73. The ring 72 is provided with a chimney 74 having cooling ribs 75, the heated air from lamp 12 passing inside of chimney 74, under the cap 76 which is held on ring 72 by post 77, and out between the posts 77 and under the flange 78 on the cap 76.

The lens assembly 66 is in the form of a lens tube 66' carried by a ring 123 surrounding the lamp 12. The lens tube 66' contains a suitable lens system for producing a line of light across the film and may for example, comprise two cylindrical lenses 124 with an intervening elongated slit 125, although a mechanical slit mounted in the outer end of lens tube 66' instead of an optical slit may be used. Lamp 12 has a socket 126 secured to plate 82 by screws 127.

At a place which does not interfere with the series of light apertures 67, the drum 68 is provided with two apertures 79 so that when the drum 68 is removed, access may be had to two screws 80 which serve to hold the lens assembly 66 to a post 81 arising from an irregular shaped plate 82 shown also in Fig. 2, the latter being held in spaced relation to the bottom of base 16 by means of three posts 83. Thus the lamp 12 is held stationary with respect to base 16. By removing nut 81' on post 81 and by removing flanged ring 72, the lens assembly 66 and post 81 may be removed through the top of the drum carrier 69, and thereafter the lens assembly 66 may be removed from the post 81 if desired, by removing screws 80.

The drum carrier 69 is rotatably mounted in a circular aperture 84 in the base 16 and is secured thereto by a flange 85 above the base 16, and a screw-threaded collar 86 below the base 16. The collar 86 has a set screw 87. Suitably secured to the lower end of the drum carrier 69 as seen in Fig. 4 is a ratchet ring 88 and rotatably mounted between the latter and the lock ring 89 is a ring 90 having a spring-pressed pawl 91.

Figure 6:
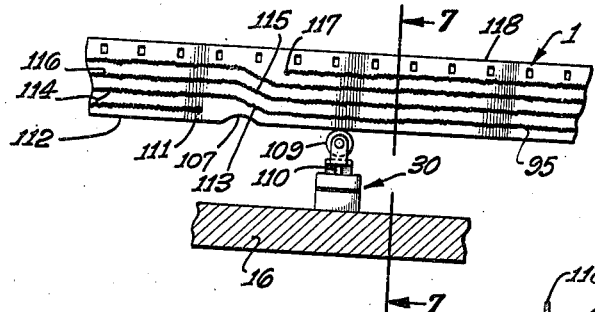
Fig. 6 illustrates the sound film of this invention with the breaker switch therefor and is a sectional view on line 6—6 of Fig. 1.
Figure 7:
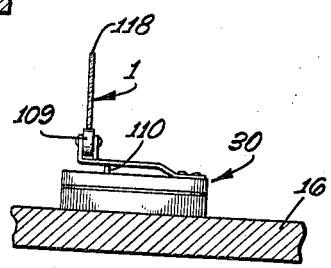
Fig. 7 is a sectional view on line 7—7 of Fig. 6 looking in the direction of the arrows.

The angular separation of adjacent notches 92 in the ratchet ring 88, with reference to the axis thereof, is the same as the angular separation of adjacent apertures 67 in the drum 68, with reference to the axis thereof. Hence by rotating the drum carrier 69 an angular distance equal to the distance between two adjacent notches 92 serves to shift from one of the apertures 67 such as 93, to the next aperture 94. The separation of the notches 67 along the axis of the drum 68 corresponds to the separation of the sound track portions 95 across the film as shown in Fig. 6. The base 16 may have a lubrication hole 96 to admit a lubricant to the bearing formed by the hole 84 in the base 16.

The pawl 91 may be normally pulled to the left as shown in Fig. 2, by means of the tension spring 97 secured at one end to pawl 91 and the other end to the base 16 as indicated at 98. Pawl 91 is mounted in a spring barrel 99 on the ring 90. The spring barrel 99 swings between two adjustable stops 100 and 101. Suitably mounted on base 16 is a solenoid 102 having its armature 103 connected by link 104 to an extension 105 of the ring 90. When solenoid 102 is energized it urges pawl 91 to the right until the spring barrel 99 strikes the stop 101, namely the distance between two adjacent notches 92. The ratchet ring 88 is impositively held in its adjusted position by means of a spring detent 106 mounted on base 16.

Figure 8:
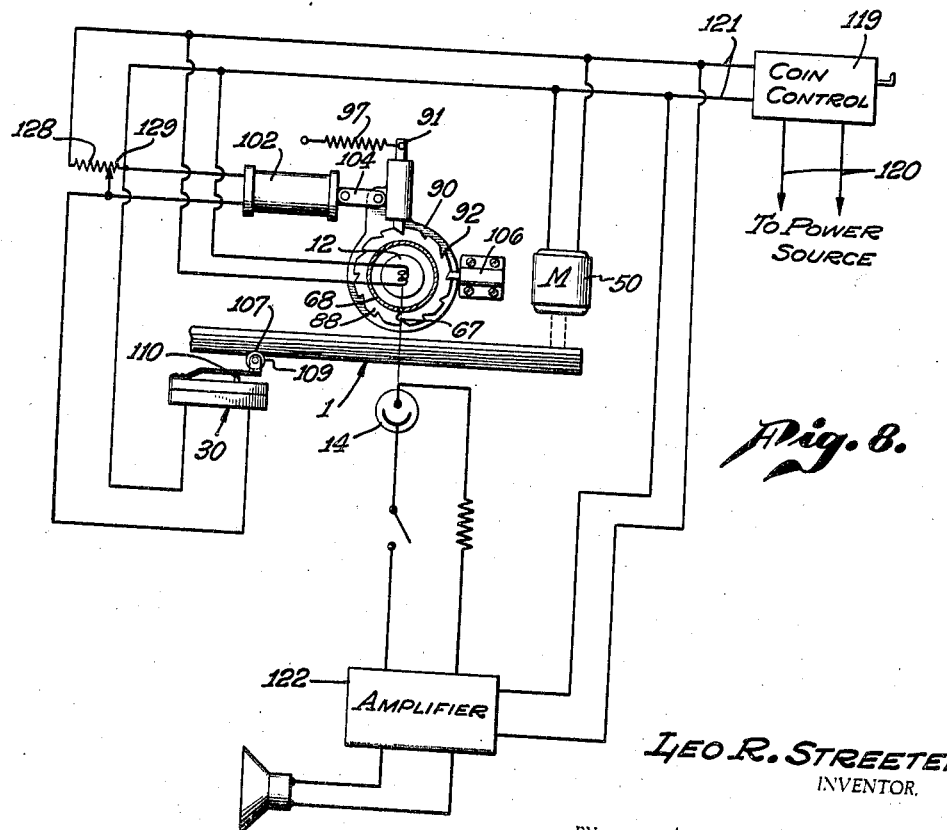
Fig. 8 is a schematical wiring diagram for the apparatus of Figs. 1 and 2.

Pawl 91 is operated by notch 107 as follows: Referring to Fig. 8, assuming the coin control 119 has been operated to connect the power source 120 to the line 121, with a resistance 128 bridged across this line, and with the circuit to solenoid 102 connected across a part 129 of resistance 128 to supply about twelve volts to solenoid 102 and with contact 110 in shunt to resistance 129, it will be seen that when roller 109 enters notch 107, the contact 110 is open to thereby supply the desired low voltage to solenoid 102, whereby it operates to urge pawl 91 to the right as before described. When roller 109 rides on the edge 112 of film 1, contacts 110 are closed, to put a shunt around solenoid 102 to render it inoperative, whereby spring 97 at this time keeps the pawl 91 in the position shown in Figs. 2 and 8.

As shown in Fig. 6, the film loop 1 is provided with a notch 107 adapted to cooperate with a film switch 108 having a roller 109 which rides on the edge of the film 1 and enters notch 107 to operate the contacts 110. Assuming the film 1 is moving to the right as shown in Fig. 6, the point 111 may be taken as the start of the sound track and from this point it proceeds parallel to and adjacent the edge 112 of the film 1, until a point adjacent the notch 107 is reached, when the sound track has a slant portion 113 which carries it away from the edge 112 a sufficient distance whereupon the sound track proceeds as indicated at 114 with a sound track portion which extends substantially the full length of the loop 111 parallel to the edge 112 until it again reaches a point adjacent notch 107 when the slant track portion 115 again carries the sound track farther away from the edge 112, the track proceeding as indicated at 116 parallel to the other sound track portions 112 and 114, and this track arrangement continuing until a desired width of the film has been used up, the whole width if desired, the track ending as indicated at a point 117 adjacent the other margin 118 of the film 1.

As before stated, a continuous sound track may be employed from the start 111 to the end 117, or I may have a series of sound records along the track, each record in the series corresponding to the time of play determined by the coin control 119 in Fig. 8, with silent intervals between adjacent records to allow time for the apparatus to warm up and get up to speed.

The coin control 119 controls the connection of the power source 120 to the line 121 which supplies power to the motor 50, the solenoid 102, the lamp 12, the cell 14 and cell amplifier 122 over obvious circuits shown in Fig. 8. The circuit to the solenoid 102 is open until such times as it is closed by the film switch 110. With power in the line 121, the film switch 110 will operate each time the notch 107 at the end of the film loop 1 is reached, to rotate drum 68 and keep one of the apertures 93, 94 etc. in register with the sound track 95 as it progresses across the slit assembly 13.

The sound track 95 may be recorded by using a continuous film loop such as 1, and by having a film notch such as 107 to laterally shift the recorder across the film each time the notch is reached. In fact, this recording may be accomplished by substituting a glow lamp for the steady light source 12, and hence the light apertures 93 and 94 will follow the track 95 as the slit assembly 13 is shifted in the same way for both recording and reproducing.

By way of illustration, the film 1 in Fig. 6 is shown as having four parallel track portions 114 etc., and four corresponding circumferentially and axially spaced light apertures 93, 94 etc., on the drum 68. In order to make it possible to rotate the drum 68 through only a small angle when shifting from one aperture such as 93 to another such as 94, I provide a plurality of sets or series of four light apertures in drum 68, an adjacent series being indicated at 67. An important feature of the invention comprises with such an arrangement the positioning of the last aperture 67' in the series 67 at the same angular distance from the first aperture 93 in the next series, as all the apertures are in all series, with the result that when rotating the carrier 68 clockwise as seen in Fig. 5 from a position where the last aperture 67' in one series registers with the track, the first aperture 93 in the next series is brought into position at the start 111 of the sound track. The same feature may be used if only one series of apertures are employed. This has obvious advantages, particularly for coin control work, as the apparatus will operate automatically to shift the sound pickup 11 from the end 117 of the track to the start 111 of the track so that the apparatus will play and repeat all of the sound records on the loop 1, with no further manual control required than simply dropping coins in the coin control 119.

It will be apparent that various modifications may be made in the invention without departing from the spirit of the following claim.

I claim:

A lens assembly comprising the combination of a support, a lamp socket secured to said support, a post arising from said support at one side of said socket, said post extending to a position adjacent the filament of the lamp for said socket, a ring coil with said socket and having a central opening to receive the lamp, means for securing said ring to said post at one side of the lamp, and a lens assembly carried by said ring at the other side of the lamp.

LEO R. STREETER.